United States Patent
Ichikawa et al.

(10) Patent No.: US 6,914,694 B1
(45) Date of Patent: Jul. 5, 2005

(54) WEB PRINT SYSTEM WITH IMAGE ENHANCEMENT

(75) Inventors: Tatsuya Ichikawa, Sunnyvale, CA (US); Takashi Miyasaka, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 958 days.

(21) Appl. No.: 09/687,043

(22) Filed: Oct. 12, 2000

(51) Int. Cl.[7] .............................................. G06F 15/00
(52) U.S. Cl. ..................................... 358/1.15; 358/402
(58) Field of Search ........................ 358/1.1, 1.9, 1.13, 358/1.14, 1.15, 402, 400, 448, 1.18, 302, 442, 408; 709/201, 203, 242, 250, 232

(56) References Cited

U.S. PATENT DOCUMENTS

| | | | |
|---|---|---|---|
| 5,533,175 A | 7/1996 | Lung et al. ................ 358/1.16 |
| 5,580,177 A | 12/1996 | Gase et al. ................... 400/61 |
| 5,760,916 A | 6/1998 | Dellert et al. ............... 358/408 |
| 5,760,917 A | 6/1998 | Sheridan ..................... 358/442 |
| 5,913,088 A | 6/1999 | Moghadam et al. ........ 396/310 |
| 5,927,872 A | 7/1999 | Yamada ........................ 400/88 |
| 5,931,906 A | 8/1999 | Fidelibus, Jr. et al. ...... 709/217 |
| 6,018,774 A | 1/2000 | Mayle et al. ............... 709/250 |
| 6,028,603 A | 2/2000 | Wang et al. ................ 345/776 |
| 6,035,323 A | 3/2000 | Narayen et al. ............ 709/201 |
| 6,058,428 A | 5/2000 | Wang et al. ................. 709/232 |
| 6,085,195 A | 7/2000 | Hoyt et al. .................... 707/10 |
| 6,091,412 A | 7/2000 | Simonoff et al. ........... 345/749 |
| 6,121,982 A | 9/2000 | Morimoto ................... 347/131 |
| 6,311,165 B1 * | 10/2001 | Coutts et al. ................. 705/21 |
| 6,519,568 B1 * | 2/2003 | Harvey et al. ................. 705/1 |
| 6,665,090 B1 * | 12/2003 | Hall et al. ................. 358/1.18 |
| 6,665,573 B1 * | 12/2003 | Blackman ................... 700/116 |

* cited by examiner

*Primary Examiner*—Gabriel Garcia
(74) *Attorney, Agent, or Firm*—Mark P. Watson

(57) ABSTRACT

A system for printing photos, or images generally, includes a server computer that stores data representing a plurality of images in a photo database. A server web interface enables communication over the Internet, and the server computer includes an image print application that enables images to be printed using a client computer connected to the server web interface over said Internet. The server computer also includes an image enhancement module that enhances an image for printing. In response to a print request (over the Internet) from the client computer, the server computer sends image data and the image enhancement module to the client computer. The server computer activates the image print application to create print commands for a printer driver, and to create enhanced image data in the client computer with the image enhancement module prior to printing. The enhanced image data is removed from the client computer immediately following printing.

10 Claims, 4 Drawing Sheets

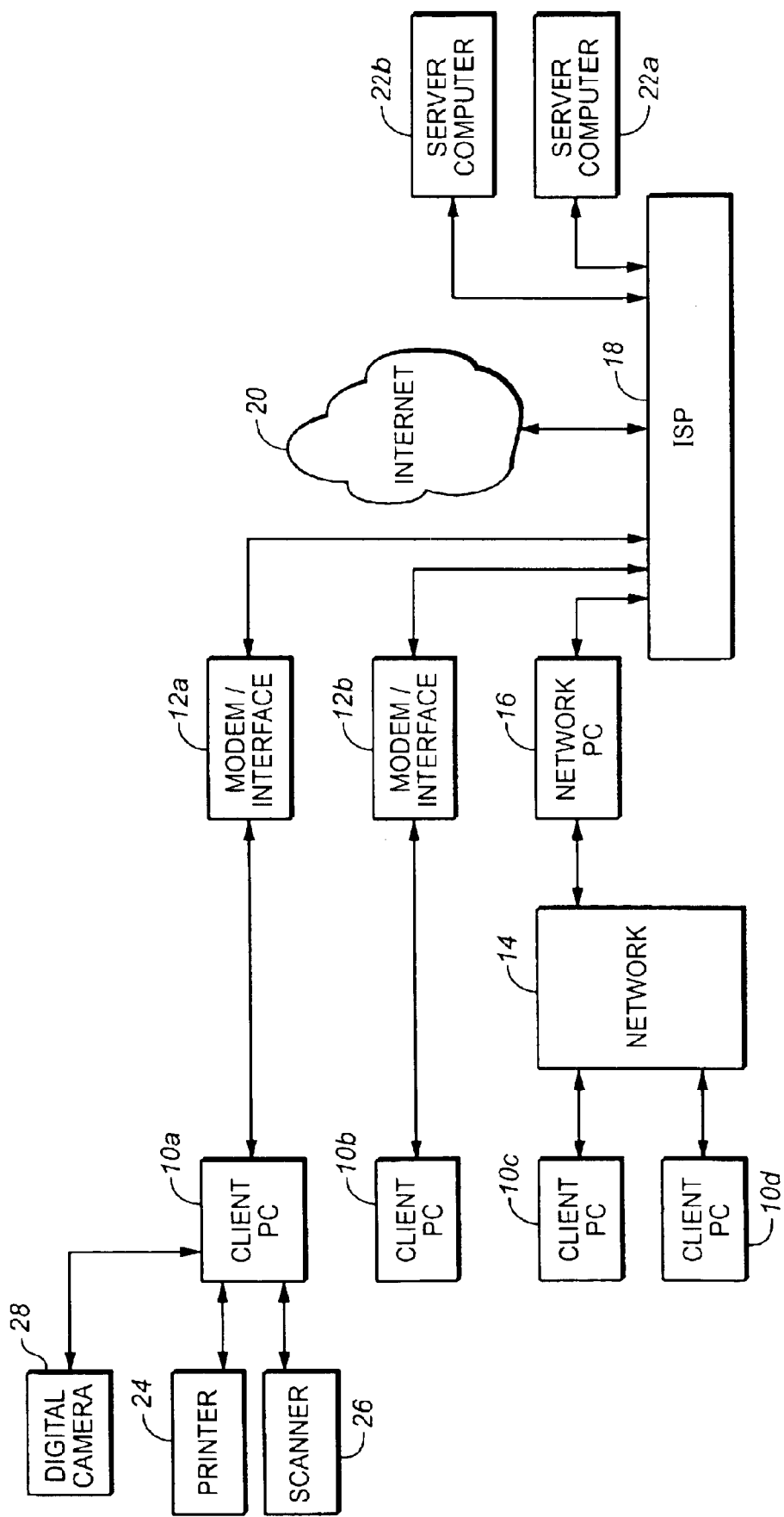
FIG._1

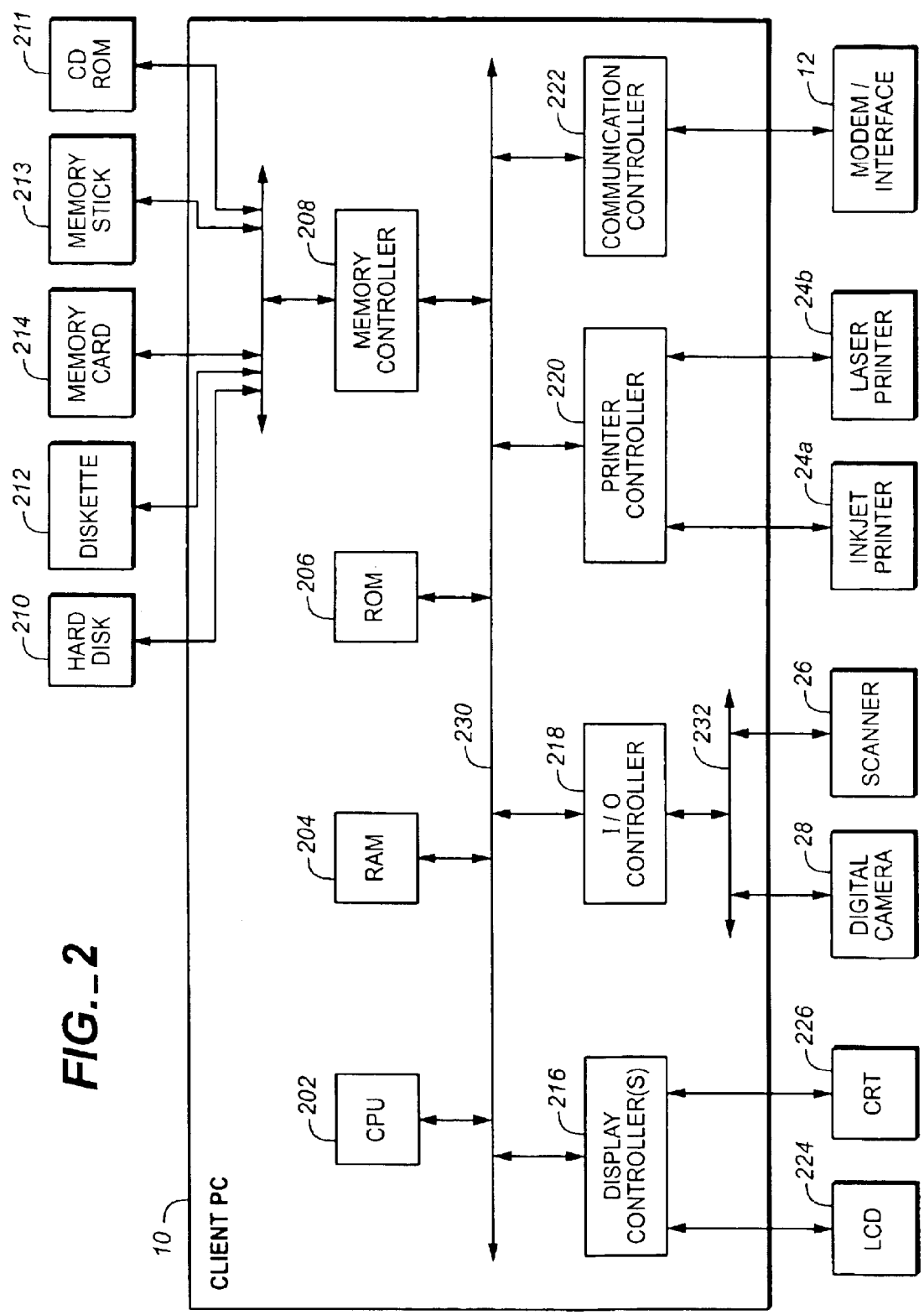
FIG._2

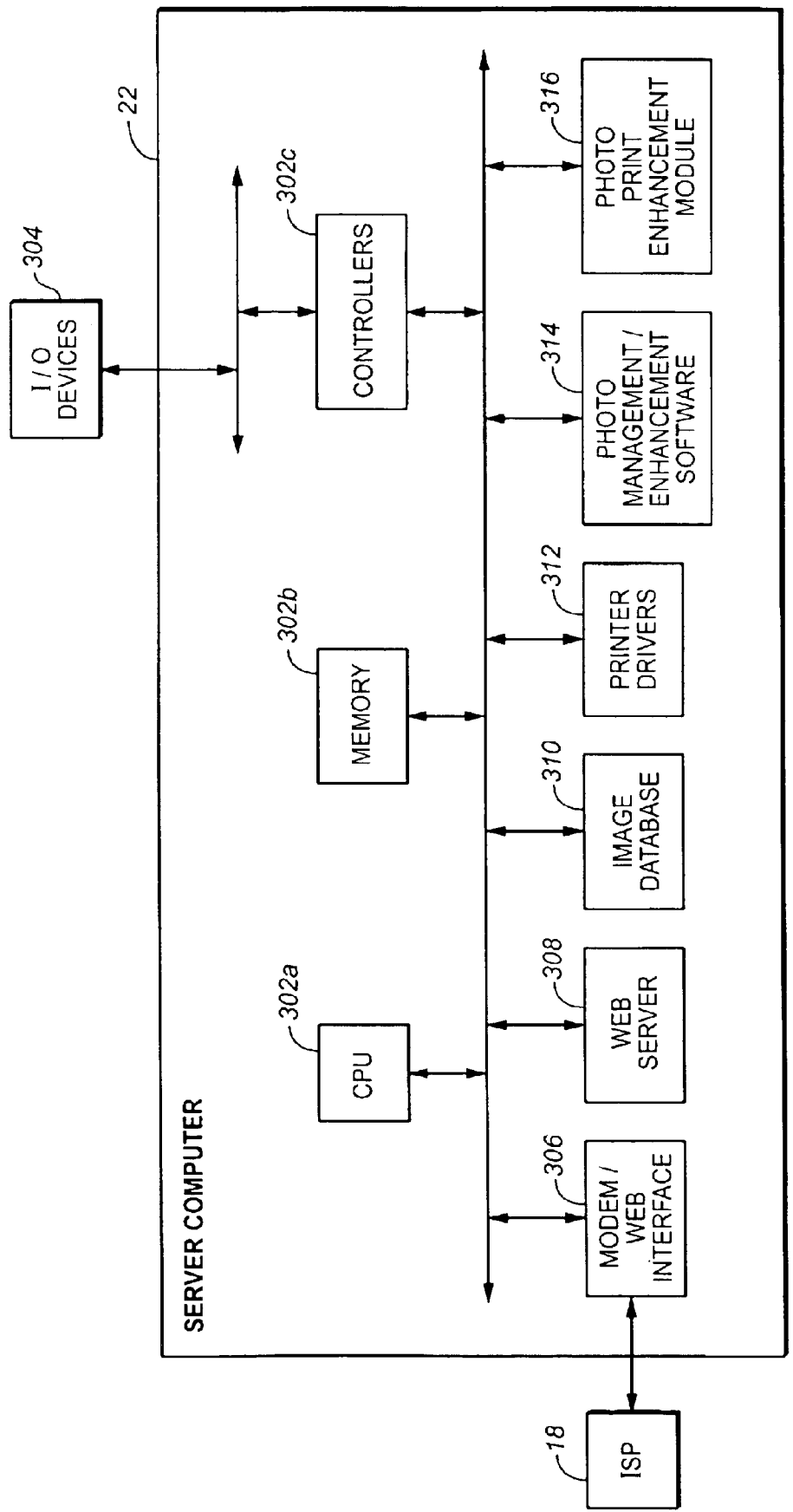
FIG._3

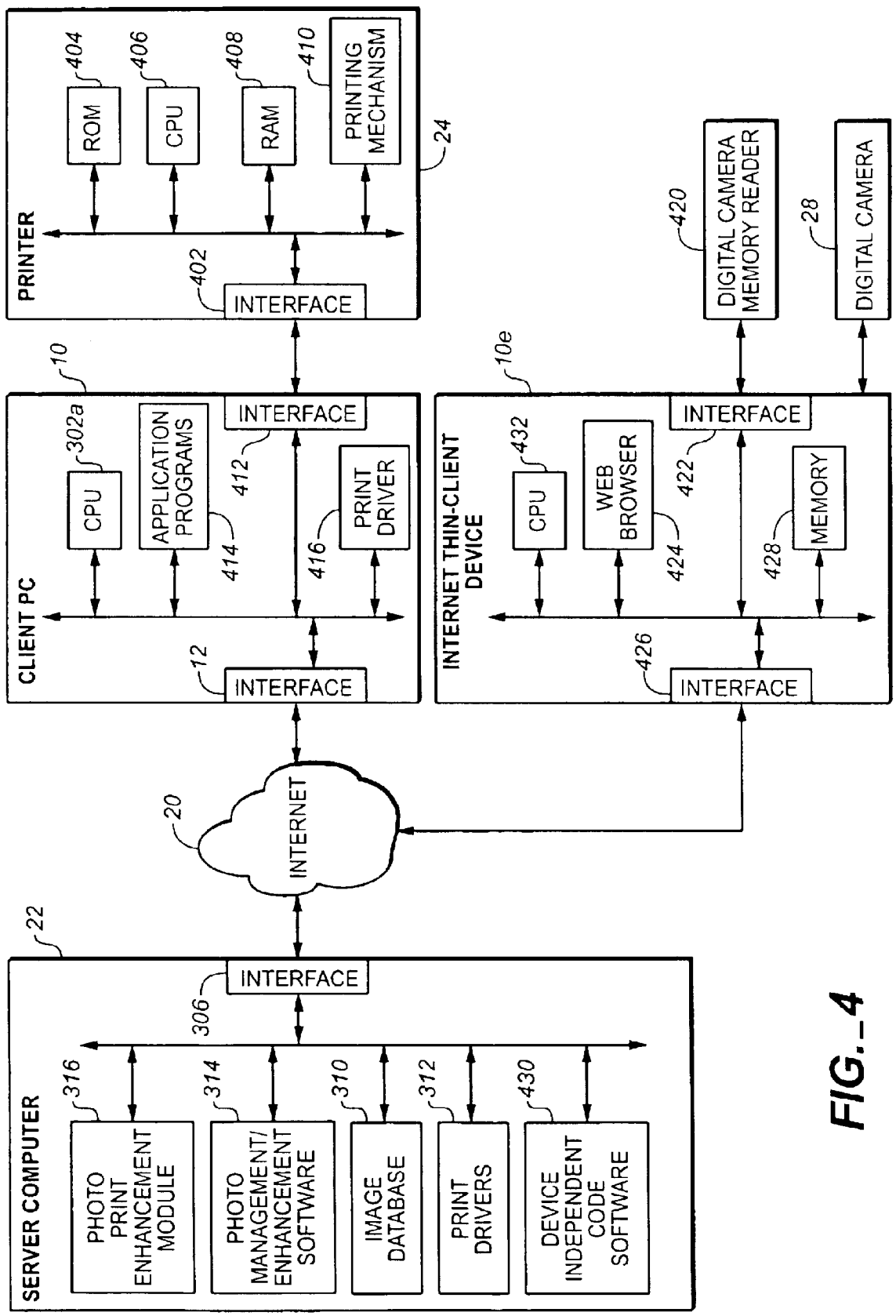
FIG._4

WEB PRINT SYSTEM WITH IMAGE ENHANCEMENT

BACKGROUND OF THE INVENTION

1. Field of the Invention

This invention relates generally to a network or system including a server computer and a number of client computers connected to the server computer preferably through the Internet and operating with the protocols of the world wide web (WWW). More particularly, the present invention relates to printing photos or image data from a client computer. It further relates to a method for restricting the use of photos improved by proprietary software. It also relates to local printing with Internet thin client devices.

2. Description of the Related Art

Photos, pictures or image data generally can be digitally stored on an individual's personal computer (PC) and printed on a laser or inkjet color printer connected to the computer. Various software programs have been developed to enable the user to manipulate the original image so that it can be rotated, cropped, brightened, resized, etc. before it is printed. Usually the photos/image data and photo manipulation programs are stored locally. However, increasingly, individuals have been placing their photos on the web so that they can be viewed or shared by others, usually authorized users such as family members and friends. When it is desired to print these shared photos locally, the printer driver and/or application program on the local PC may not provide the optimal output.

OBJECTS OF THE INVENTION

Therefore, it is an object of the present invention to have a print enhancement program that is activated on the web site and goes into effect when the user selects printing from his local PC.

This print enhancement program may be proprietary to the web host. It is therefore a further object of the present invention to prevent the results of the print enhancement from being saved locally or be used after printing.

The client or local computer may be an Internet thin client device with limited operating system software or application programs. It is therefore another object of the present invention to provide print application and enhancement software that can be downloaded to the Internet thin client device.

SUMMARY OF THE INVENTION

In the present invention, the image data (e.g. photo) will reside on a server computer, i.e. stored in an image database. During a dialog between the user and the web page (client PC and server), the photo will be presented to the user on the web page. The user will also be presented with a PRINT button or icon that he/she can select (click on) to cause the photo to print locally on his/her printer. Also, the user will be presented with an ENHANCEMENT button or icon that the user can select or deselect.

If the user clicks on the PRINT button with the ENHANCEMENT button selected, the server computer will download a print application program (i.e. a print utility) with the image data and layout information, and will also download a Photo print enhancement module. This module will only be downloaded once and will thereafter reside on the client PC 10 where it can be invoked or activated each time the user clicks on the PRINT button with the ENHANCEMENT button selected. This transfer will occur over the Internet from the modem/web interface of the server computer to the modem/interface of the client PC.

The Photo print enhancement module executes a predetermined operation on the image data. This operation can depend on the printer model that will be used to print the image. Since the Photo print enhancement module will be applicable only to certain printers, i.e. those supported by the web site, it is a feature of the present invention that the image data enhanced by the Photo print enhancement module is removed from the client PC after the photo is printed. This prevents local saving of the enhanced photo and thereby prevents it from being printed on a printer that is not supported by the web site. Thus, the only way to print a photo enhanced by the Photo print enhancement module is by clicking on the PRINT button with the ENHANCEMENT button selected at the web site. Further, the print application program will include a system call that removes the file in which the Photo print enhancement module applied image was created so that the enhanced image no longer resides anywhere on the client PC.

The present invention can also be used with an Internet thin client device such as a set-top box, web-enabled phone, or hand-held PDA. These devices are small with limited functionality such as address books, e-mail, and wired or wireless Web browser ability.

The Internet thin client device communicates with the server computer through a web browser and interface (e.g. modem, wireless communicator, etc.). The Internet thin client device provides an environment (e.g. a JavaScript Interpreter residing in memory) that allows device independent code to be executed. The server computer provides a photo printing application that, as discussed above, may be a print utility, or may be a program written in independent code, such as a JAVA application (Applet). The Photo print enhancement module may also be a JAVA Applet. When the Internet thin client device is in communication with the server computer over the Internet, the server web page will provide a separate Print Local Photo button or icon.

When the user clicks on this button, the server will send the photo printing application to the client PC, preferably as one or more JAVA Applets within an HTML document. The HTML document will be handled by the web browser and stored in memory with the JAVA Applets being run automatically. At this stage there is no further data exchange between the server computer and the Internet thin client device. The photo printing application will read all the photo thumbnails stored on the digital camera memory card or from a memory stick, for example. These thumbnails will be displayed to the user with a Local Print button where he/she can select the photos to be displayed. The photo printing application will then render the image and supply it through a printer driver that is also downloaded in a device independent code. This embodiment reduces the amount of data traffic between the server and Internet thin client device. However, photos can also be uploaded to the server and stored in a photo album and printed from the server as discussed above.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

FIG. 1 is a block diagram of the overall system configuration of the present invention;

FIG. 2 is a general block diagram of a client PC used in the present invention;

FIG. 3 is a general block diagram of a server computer used in the present invention; and FIG. 4 shows the principal components utilized in the client PC, server, printer, and Internet thin client of the present invention.

DESCRIPTION OF THE PREFERRED EMBODIMENTS

Reference is now made to FIG. 1 that shows the general configuration of the system or network of the present invention. A plurality of client PCs 10a–10d are shown connected through the Internet 20 to one or more server computers 22a, 22b. Each of the client PCs can be connected to a variety of input and output devices. For the sake of illustration only, client PC 10a is shown connected to a digital camera 28, scanner 26 and printer 24. It will be understood that each of the client PCs will be connected to corresponding or additional I/O devices (not shown for simplicity).

Each of the client PCs is connected to the Internet through an Internet Service Provider (ISP) 18. For simplicity, only one ISP is shown in the figure. However, typically each client PC may connect to the Internet through a different ISP. Client PCs 10a, 10b are connected to ISP 18 through a respective modem or interface 12a, 12b. Modem or interface 12a, 12b may be a dial-up modem, cable modem, DSL interface, wireless satellite network interface, etc. Client PCs 10c and 10d are connected to ISP 18 through network 14 and network PC 16. Network 14 may be a local area network (LAN) in a building or wide area network (WAN) in a corporation, for example. Network PC 16 may be a network server computer that provides Internet connection as well as firewall and virus protection for the client PCs 10c, 10d.

FIG. 2 shows a typical client PC 10 in more detail. It will be appreciated that this is just an example embodiment of a client PC. The actual client PC may have many more or far less components and features than described herein. For example, client PC 10 may be an "internet thin client device", i.e. a limited application PC or TV set-top box device having only a Web browser, e-mail capability, and limited I/O functions. However, a typical client PC 10 may include, for example, a central processing unit (CPU) 202, which may be a microprocessor such as an Intel Pentium, a random access memory (RAM) 204, and read only memory (ROM) 206. In addition, a number of storage devices may be provided such as hard disk 210, diskette 212, and memory card 214, which may be controlled by memory controller 208 that provides memory management, allocation and priority arbitration, for example. Addition data storage devices include a CD ROM 211, and a flash memory product such as Sony's rewritable, portable memory stick 213 that stores data such as digital photographs. The memory stick can be inserted into an Internet thin device such as a TV set-top box or PDA device. Client PC 10a will include operating system (OS) software and application programs that may be stored on hard disk 210, for example, and may be partially loaded into working memory such as RAM 204. One of the application programs will be web browsing software in the present invention. Start up or boot programs may be stored in ROM 206.

Data and control commands are transferred internally over bus 230. Connected to bus 230 is one or more display controllers 216, I/O controller 218, printer controller 220 and communications interface 222. Display controller(s) 216 control and interface with an LCD 224 and CRT 226, for example. I/O controller manages communication over I/O bus 232 with various peripheral devices such as digital camera 28 and scanner 26. Printer controller 220 controls inkjet printer 24a and laser printer 24b. Communication interface 222 controls external communication with, for example, modem/interface 12a. While each of the various parts of client PC 10 is shown as separate functional units for convenience, they may share hardware, software, and/or firmware in a particular environment, such as a system on a chip.

FIG. 3 illustrates generally server computer 22 (hereinafter sometimes referred to as "server". Server 22 may also consist primarily of a PC or may be a more powerful device with multiprocessor, task sharing capability with a great deal of storage space. It may have all, some, or more of the functional components shown and discussed in connection with client PC 10. For the sake of illustration only, these components (i.e. CPU, ROM, RAM, memory controller, display controller, etc.) are shown as single blocks labeled CPU 302a Memory 302b and Controllers 302c. Similarly, all the peripheral devices (i.e. hard disk, LCD, digital camera, printer, etc.) are shown as I/O devices 304.

Typically, the server will have a modem or web interface 306 for connection to the Internet through an ISP. Communication with the Internet will be through web server 308. The web server essentially functions to provide a web site that provides client PC access to files containing hypertext documents, stored preferably in image database 310. It should be noted that, in FIG. 3, the web server 308 and image database 310, as well as printer drivers 312, photo mangement/enhancement software 314, and photo print enhancement module 316 are shown as functional blocks but may comprise software stored in memory such as a RAM or hard disk (shown generally as memory in block 302b) or may be a combination of one or more of software, hardware, firmware, ASIC, etc.

The web server 308 may consist of conventional software that supports the hyper text transfer protocol (HTTP). A client PC makes a request over the Internet to view the web page supported by web server 308 by specifying its Uniform Resource Locator (URL) or web address. The server responds by returning text describing the web page in the hyper text markup language (HMTL).

In the present invention, the web page opens with a Welcome Page where users of the client PC 10 can log in. The Welcome Page may have a sign-in or log-in area with alphanumeric input fields for a user id and password and links to other pages. One such linked page may be a Sign Up Page for users that are new to the site. There the user can enter his/her name and e-mail address, and choose and verify a password. Next, the user can upload images to the server 22. Preferably, these images are photos that have been input to the client PC 10 and saved in local memory. The user will specify the file name of the photo that is to be uploaded and the location into which it will be uploaded. In a preferred embodiment, the images are photos and the user can specify the storage location in image database 310 by identifying an Album name, if one already exists, or creating a new Album. This process is implemented using a query system with drop-down fields, as are well known, such that the user from the client PC is guided through on a step-by-step basis to create a photo album that is stored on the server 22 and can thereafter be viewed by other users on other client PCs.

When the images are uploaded to the server, they are saved in a location within the Album (file) with an id and preferably a thumbnail (low resolution image) of the original. When the user retrieves (looks at) the Album, photo/management enhancement software 314 can display the thumbnails of all the uploaded images and the user can select various options such as image rotation, cropping, deletion, etc. As will be appreciated, requests from the client PC 10 to view information on the server 22 are made through the web browser on the client PC 10. The photo/management enhancement software 314 provides the requested information (e.g. photos) to the web server 308 in a form (e.g. HTML format) that is viewable by the web browser on the client PC 10.

Photos, or image data generally, are input to the client PC 10 through digital camera 28 or scanner 26, for example. Alternately, the photos can be input from a storage device such as CD ROM 211 or memory stick 213. Typically, the user saves the image data by selecting a file name and the image is stored in local memory such as hard disk 210 under control of a file management system, i.e. a disk operating system. An image or photo management program will create a link to the photo stored and the link will be saved in a database. This may also involve creating and storing a thumbnail (low resolution image) of the original photo in the database along with the link to the original photo.

A particular aspect of the present invention is printing of a selected photo on a local printer with the client PC 10. This aspect will be explained with reference to FIG. 4 in which only pertinent features/functions of the client PC 10, server 22 and printer 24 are shown. The server 22 includes a photo print enhancement module 316. This module changes the image data representing the photo before it is sent to the printer 24 for printing. The enhancement module 316 will be device dependent and may function according to the brand and model of the printer being used. As a simple example, the enhancement module 316 may brighten the image before the image data is sent to the printer. In particular, it is desirable in the present invention that the enhancement module is available only when a printer made by a particular company is used.

When the client PC 10 and server 22 are in communication over the Internet, a print dialog will take place. For example, the user accessing the web page on the server 22 may select a photo from his/her photo album stored in image database 310 for printing on a local printer 24. A print dialog page on the server will include a print button or icon. A printer driver dialog box will then appear that allows the user to select the paper size, for example. The printer driver dialog box will depend on which printer is connected to the client PC 10 and which corresponding printer driver is installed. The server 22 will support only certain printer models. If a different printer is connected to the client PC 10, the server 22 will display a message on the web page such as "The printer connected to your computer is not supported on our site for printing." This aspect has certain business advantages. The web site provides a facility for users to store and share their photos at no cost. The web site is developed and maintained by a printer company, say Company A. When the user visits the photo sharing web site he or she is presented with opportunities (links) to Company A's products and services. Further since the web site supports only Company A's printers, the user is encouraged (forced) to buy one of Company A's printers if he/she wants to print photos from the web site.

Another key aspect of the present invention is that enhanced photos can only be printed. They cannot be saved locally. This prevents the user from using Company A's photo print enhancement module 316 to improve his/her photo, saving it locally, and then attempting to print it on a non-Company A printer after leaving the web site.

FIG. 4 shows a block diagram of the basic structure of printer 24. Printer 24 is connected to client PC 10 by way of interface 402. The control program for printer 24 is stored in ROM 404, and CPU 406 manages overall control of printer 24 based on this control program. RAM 408 is used as a print buffer, receive buffer, and working memory by CPU 406.

When interface 402 receives data from client PC 10, it sends a receive interrupt to CPU 406, and CPU 406 starts a receive interrupt process. The receive interrupt process buffers (stores) the received data in the receive buffer reserved in RAM 408. In the normal process, CPU 406 sequentially reads data stored in the receive buffer, and performs processes according to the data. For example, if the command changes a particular setting of printer 102, the CPU 301 changes the printer 102 setting in accordance with the received command. If print data for printing text or graphics is buffered, font information is read from ROM 308, and if image data is buffered a print image is generated in the print buffer of RAM 307. The print head, paper feed mechanism, and other parts of the printing mechanism 410 are then driven to print the text, graphics or photo image on the printing medium when the print image has reached a predefined size, such as one line of data, in the print buffer.

Commands and data are sent from client PC 10 through interface 412 to printer 24. These commands and data are created by CPU 302a using one or more application programs 414 and they describe the contents of a page, i.e. layout, text, graphics, image data, etc. The information generated by the application program is translated by the printer driver 416 into printer commands that are specific to a particular printer. Each model of printer will have its own printer driver that must be loaded in the client PC 10. The commands, and the text/image data, are sent to the printer and interpreted by its CPU 406.

In the present invention, the image data (e.g. photo) will reside on server 22, i.e. stored in image database 310. During the dialog between the user and the web page (client PC 10 and server 22), the photo will be presented to the user on the web page. The user will also be presented with a PRINT button or icon that he/she can select (click on) to cause the photo to print locally on his/her printer 24. Also, the user will be presented with an ENHANCEMENT button or icon that the user can select or deselect. If the user clicks on the PRINT button with the ENHANCEMENT button deselected, server 22 will download a print application program with the image data and layout information. The print application program will be run by CPU 302a to create commands that will be used by the printer driver to create print commands for the printer 24, and the photo will be printed. If the print application program does not find a printer driver for a printer supported by the web site it will report this fact back to server 22 and a warning will posted on the web page such as "The printer connected to your computer is not supported on our site for printing." This will terminate the print session.

If the user clicks on the PRINT button with the ENHANCEMENT button selected, server 22 will download a print application program (i.e. a print utility in the Photo Management/Enhancement Software 314) with the image data and layout information, and will also download the photo print enhancement module 316. This module will only be downloaded once and will thereafter reside on the client PC 10 where it can be invoked or activated each time the user clicks on the PRINT button with the ENHANCEMENT button selected. This transfer will occur over the Internet from the modem/web interface 306 of server 22 to the modem/interface 12 of the client PC 10.

The photo print enhancement module 316 executes a predetermined operation on the image data. This operation can depend on the printer model that will be used to print the image. As an example, for a particular model, the entire image data can be brightened or lightened. It may be, for example, that certain printer models tend to print photos that are darker than the original or at least darker than they appear when displayed on a CRT. This may be a function of the color space of the printer or the color matching ability of the printer for highly saturated colors that often appear in photos but not in text or typical graphics. So, a solution is to increase the lightness values for all image data representing the photo, which presents an improved printed photo for a majority of images.

Since the photo print enhancement module 316 will be applicable only to certain printers, i.e. those supported by the web site, it is a feature of the present invention that the image data enhanced by the photo print enhancement module 316 is removed from the client PC 10 after the photo is printed. This prevents local saving of the enhanced photo and thereby prevents it from being printed on a printer that is not supported by the web site. Thus, the only way to print a photo enhanced by the photo print enhancement module 316 is by clicking on the PRINT button with the ENHANCEMENT button selected at the web site. Further, the print application program will include a system call that removes the file in which the photo print enhancement module 316 applied image was created so that the enhanced image no longer resides anywhere on the client PC 10.

The present invention can also be used with an Internet thin client device 10e such as a set-top box, web-enabled phone, or hand-held PDA. These devices are small with limited functionality such as address books, e-mail, and wired or wireless Web browser ability. Some are also provide with limited I/O capability such as memory card or memory stick input slots and, digital camera memory reader interface, and a printer port. They generally will not have a lot of application programs or printer drivers since their memory space is limited. In this environment, the photos to be printed may reside on a digital camera 28 and the Internet thin client 10e is connected through interface 422 to a digital camera memory reader 420, which is connected to digital camera 28.

The Internet thin client device 10e communicates with server 22 through web browser 424 and interface 426 (e.g. modem, wireless communicator, etc.). The Internet thin client device 10e provides an environment (e.g. a JavaScript Interpreter residing in memory 428) that allows device independent code to be executed. The server 22 provides a photo printing application that, as discussed above, may be a print utility in the photo management/enhancement software 314, or may be a program written in independent code, such as a JAVA application (Applet) stored in independent code software 430. The photo print enhancement module may also be a JAVA Applet store in independent code software 430. When the Internet thin client device 10e is in communication with the server 20 over the Internet, the server web page will provide a separate Print Local Photo button or icon.

When the user clicks on this button, the server will send the photo printing application to the Internet thin client 10e, preferably as one or more JAVA Applets within an HTML document. The HTML document will be handled by the web browser 424 and stored in memory 428, with the JAVA Applets being run automatically under control of CPU 432 and a JavaScript Interpreter residing in memory 428. At this stage there is no further data exchange between the server 22 and Internet thin client device 10e. The photo printing application will read all the photo thumbnails stored on a memory card of the digital camera 28 or from a memory stick, for example. These thumbnails will be displayed to the user with a Local Print button where he/she can select the photos to be displayed. The photo printing application will then render the image and supply it through a printer driver that is also downloaded in a device independent code. This embodiment reduces the amount of data traffic between the server and Internet thin client device. However, photos can also be uploaded to the server and stored in a photo album and printed from the server as discussed above with reference to the client PC 10.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A system for printing images comprising:

a server computer including:
  memory that stores data representing a plurality of images;
  a server web interface that enables communication over the Internet;
  an image print application that enables images to be printed using a client computer connected to said server web interface over said Internet;
  an image enhancement module that enhances an image for printing;

a printer;

a client computer connected to said printer, said client computer including:
  a client web interface that enables communication over the Internet;
  a printer driver that generates image data representing images for printing by said printer;

said server computer including a web server responsive to a print request from said client computer for sending image data and said image enhancement module to said client computer and activating said image print application to create print commands for said printer driver, and to create enhanced image data in said client computer with said image enhancement module prior to printing, to print said enhanced image data and to remove said enhanced image data from said client computer immediately following printing.

2. A system for printing images as in claim 1, wherein said image print application is written in device independent code and is sent by said server computer to said client computer in response to a print request from said client computer.

3. A system for printing images as in claim 1, wherein said image enhancement module is written is device independent code.

4. A system for printing images comprising:
a server computer including:
- a server web interface that enables communication over the Internet;
- an image print application written in device independent code that enables images to be printed using a client computer connected to said server web interface over said Internet;

a printer;

a memory device that stores data representing a plurality of images;

a client computer connected to said printer and to said memory device, said client computer including:
- a client web interface that enables communication over the Internet;

said server computer including a web server responsive to a print request from said client computer for sending said image print application written in device independent code to said client computer, said image print application being activated upon receipt by said client computer to read image data from said memory device to create printable image data to print said printable image data on said printer, and to remove said printable image data from said client computer immediately following printing.

5. A system for printing images as in claim 4, further comprising an image enhancement module that enhances an image for printing, said image enhancement module being written is device independent code and sent by said server computer to said client computer in response to a print request from said client computer.

6. A system for printing images as in claim 5, wherein said image print application is activated upon receipt by said client computer to read image data from said memory device, and further to create enhanced image data in said client computer with said image enhancement module prior to printing, to print said enhanced image data, and to remove said enhanced image data from said client computer immediately following printing.

7. A method for printing images comprising:
storing data representing a plurality of images in a memory of a server computer;

providing an image print application that enables images to be printed using a client computer connected to said server over said Internet;

providing an image enhancement module that enhances an image for printing using said client computer;

receiving an image data print request from said client computer over the Internet;

sending image data and said image enhancement module to said client computer;

activating said image print application to create print commands for a printer driver in said client computer;

creating enhanced image data in said client computer with said image enhancement module prior to printing;

printing said enhanced image data; and, removing said enhanced image data from said client computer immediately following printing.

8. A method for printing images as in claim 7, wherein said image print application is written in device independent code and further comprising sending said image print application to said client computer in response to a print request from said client computer.

9. A method for printing images as in claim 8, wherein said image enhancement module is written is device independent code.

10. A method for printing images comprising:
storing data representing a plurality of images in a memory device connected to a client computer;

providing on a server computer an image print application written in device independent code that enables images to be printed using said client computer connected to said server computer over said Internet;

receiving an image data print request from said client computer over the Internet;

sending said image print application written in device independent code to said client computer;

activating said image print application upon receipt by said client computer to read image data from said memory device and to print said image data on a printer connected to said client computer;

creating enhanced image data in said client computer with an image enhancement module prior to printing;

printing said enhanced image data; and, removing said enhanced image data from said client computer immediately following printing.

* * * * *